United States Patent [19]
Roberts

[11] Patent Number: 5,563,632
[45] Date of Patent: Oct. 8, 1996

[54] METHOD OF AND APPARATUS FOR THE ELIMINATION OF THE EFFECTS OF INTERNAL INTERFERENCE IN FORCE MEASUREMENT SYSTEMS, INCLUDING TOUCH - INPUT COMPUTER AND RELATED DISPLAYS EMPLOYING TOUCH FORCE LOCATION MEASUREMENT TECHNIQUES

[75] Inventor: Jerry B. Roberts, Arlington, Mass.

[73] Assignee: Microtouch Systems, Inc., Metheun, Mass.

[21] Appl. No.: 55,731

[22] Filed: Apr. 30, 1993

[51] Int. Cl.$^6$ ............................................. G09G 5/00
[52] U.S. Cl. ................................. 345/173; 345/156
[58] Field of Search ........................... 345/173, 174, 345/175, 177, 178, 156, 184, 104, 157, 160, 163, 168; 178/18, 19; 364/556, 566, 558; 341/22, 34; 73/65.01, 865.7, 117

[56] References Cited

U.S. PATENT DOCUMENTS

| | | | |
|---|---|---|---|
| 3,657,475 | 4/1972 | Peronneau et al. | 178/18 |
| 4,327,578 | 5/1982 | D'Angelo | 73/117 |
| 4,389,711 | 6/1983 | Hatta et al. | 364/556 |
| 4,745,565 | 5/1988 | Gawin et al. | 178/18 |
| 4,918,262 | 4/1990 | Flowers et al. | 178/18 |
| 5,038,142 | 8/1991 | Flowers et al. | 178/18 |

*Primary Examiner*—Richard Hjerpe
*Assistant Examiner*—Lun-Yi Lao
*Attorney, Agent, or Firm*—Rines and Rines

[57] ABSTRACT

A method and apparatus is disclosed, particularly, though by no means exclusively, useful in touch—screen computer CRT display systems and the like, and more generally in other force and/or torque measurement systems, as in weighing and the like, in which (1) lineal and/or rotational acceleration of the system is sensed in response to inertial interference effects such as tilt or movement that introduce errors into the force and/or torque measurements, and/or (2) inertial error correction from the force data itself is obtained, such as derivative order corrections; and such data is used to correct the force and/or torque measurements. A novel calibration technique for deriving appropriately descriptive coefficients to the particular system for the correcting data, is also disclosed.

33 Claims, 8 Drawing Sheets

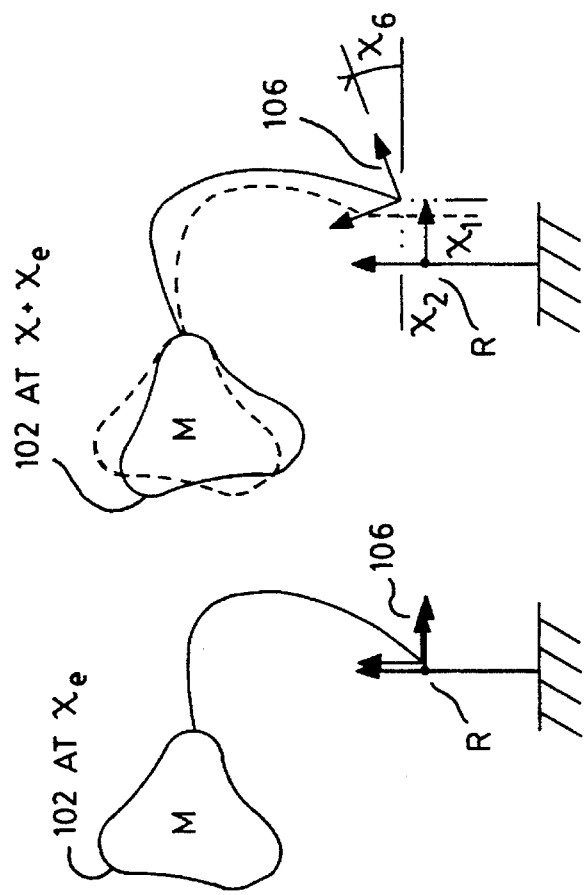
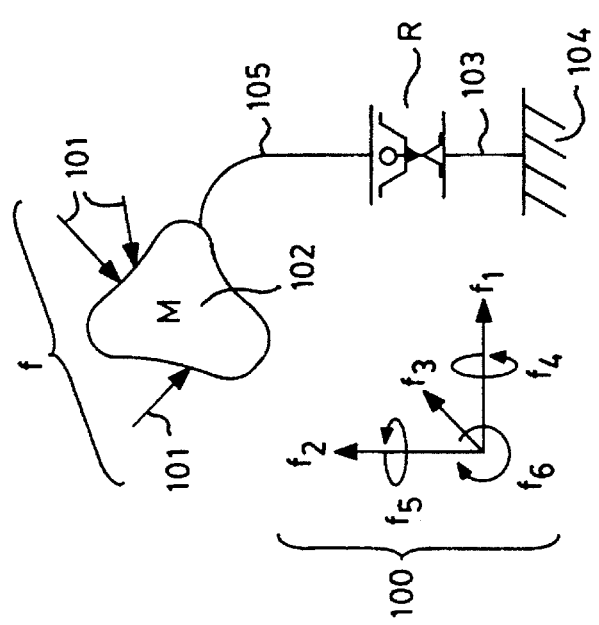
FIG. 6B
FIG. 6A

METHOD OF AND APPARATUS FOR THE ELIMINATION OF THE EFFECTS OF INTERNAL INTERFERENCE IN FORCE MEASUREMENT SYSTEMS, INCLUDING TOUCH - INPUT COMPUTER AND RELATED DISPLAYS EMPLOYING TOUCH FORCE LOCATION MEASUREMENT TECHNIQUES

The present invention relates to the use of force measurement techniques, as in touch screen or other touch input computer cathode ray tube (CRT) or related displays to locate the points of touch on the face of the display, and under adverse circumstances where the display apparatus is rather heavy and imperfectly or poorly or insecurely supported or mounted so as to be subject to inertial interference effects, such as vibration or sway, that may cause errors in the force measurement and resulting computed touch location.

While directed, accordingly, to obviating such inertial interference effects and rendering the force measurements immune to the disturbing effects of movement of the mass supported by the force measuring apparatus, as from such unsteady mountings or supports for the force measuring apparatus, the invention even more broadly finds use also with analagous problems arising in other force measuring applications, as well; such as, for example, those of weighing objects on a relatively insecure or moving support, or effecting such weighing in the presence of a relatively large tare mass or counterweight that is excited by rapid operation.

From still a broader viewpoint, the invention relates to enabling the accurate measurement of rapidly changing forces in situations where the associated mass displacements can cause significant inertial interference.

BACKGROUND OF INVENTION

As above noted, the invention has important application in touch input computer and related displays that employ touch force location measurement techniques. In particular, it provides significant immunity to inertial interference effects in specific systems such as those described in my earlier U.S. patent application Ser. No. 857,241, filed Jan. 25, 1992, for METHOD OF AND APPARATUS FOR TOUCH—INPUT COMPUTER AND RELATED DISPLAY EMPLOYING TOUCH FORCE LOCATION EXTERNAL TO THE DISPLAY, now U.S. Pat. No. 5,376, 948.

Before proceeding, however, to address such specific applications, it is believed helpful to consider first the general problems of the vibration, sway or other movement of heavy or poorly or insecurely mounted force measuring systems that may introduce errors into the force measurements and the resulting computations stemming therefrom.

There is always some amount of mass associated with the "measurement side" of a force measuring device to which an unknown force is applied, including all or some portion of the measuring device itself, and the attachment and any related objects between them. If and when the device support changes motion, this supported mass is generally also accelerated. Since the force creating this acceleration passes through the device, the device output can no longer accurately reflect the unknown force.

Additionally, the attachment, the device itself, and the device support, deform in some degree when the unknown force is applied; usually, in an elastic manner. Thus the supported mass must undergo some acceleration as the unknown force changes, at which times the device output responds not to the unknown force alone, but also to the inertial reaction force of the supported mass.

These effects are of practical concern when, for example, a force must be measured in the presence of an unsteady support and an appreciable supported mass, or a rapidly changing force must be measured in the presence of appreciable supported mass and compliance.

An approach to try to avoid such difficulties may reside in attempting to avoid the combinations of conditions listed above. Where such combinations are, however, unavoidable, two prior art techniques for amelioration are noted: viscous damping of the mechanical system itself, and linear filtering of a measurement signal derived therefrom. Damping is primarily applicable to situations such as weighing, where a force, once applied, remains constant until its measurement is completed. During such time as the force remains constant (exclusive of the inertial effects), the inertial error decays exponentially. When the force must be measured as it changes, on the other hand, linear filtering may be particularly applicable. The filter may be of analog electronic, digital electronic, or even mechanical construction, and is typically of low-pass or mixed low-pass and notch design. It passes low frequencies unaltered, but blocks those at and/or near the resonant frequencies, of the suspended mass. A measurement is thus obtained which accurately reflects the low frequency part of the unknown force, but at the expense of abandoning measurement of the high frequency part. Both damping and filtering typically provide faster measurement than can be acheived with no ameliorating technique: but not so fast as could be obtained were there no inertial interference present, or if there were some way to estimate such interference sufficiently accurately so that it could be subtracted from the total signal.

It is to the provision of a novel ameliorating approach that the invention is directed, and will be hereinafter described in terms of the illustrative system of said copending patent application, wherein force measurement is used to locate finger touches on a typical CRT display monitor. Such application necessitates the accurate measurement of as much as 80 pounds, and must contend with flexure in the monitor housing and stand, and the table beneath, as well as in the force measuring platform itself. It has been found that good results (location errors less than 0.1 inch) can routinely be achieved with such a system, provided the table is solid and the monitor housing rests on the platform through small, corner-located feet. The lowest resonant frequencies of such combinations run in the range of 6 to 10 Hz, and a linear filter that strongly blocks frequencies above 5 Hz has been found to provide adequate speed of response.

Such is not, however, the case for less secure monitor supports. Many monitors, indeed, are supplied with a "tilt-swivel" stand. This form of support raises the monitor center of gravity and softens its support, particularly with respect to fore-aft and side-to-side nodding motions. These two changes directly affect the two lowest frequency eigenmodes, dropping them to about 3 Hz for a large monitor on a tilt-swivel stand. A comparable depression of lowest resonant frequencies is seen when a free-standing folding table is used below the platform and monitor. In addition, disturbances such as bumping or leaning upon an insecure table can introduce large low-frequency inertial errors independent of the free resonant frequencies of the system.

While linear filtering with a lower cutoff frequency could, in some instances, be used to eliminate excessive interference from these lower frequencies, this would be only at the cost of a touch response delay which is unacceptable. On the other hand, with only the higher frequency filtering in place, position errors can grow to as much as several inches for touches applied when the table and/or monitor are shaking from moderate bumping, or from several rapidly delivered strong touches.

As before stated, it should be noted that analogous difficulties may arise in other force measuring applications, such as that of weighing objects on an insecure or moving support, or weighing in the presence of a large tare mass which is excited by rapid operation.

The invention therefore provides a new solution to this class of problems.

OBJECTS OF INVENTION

It is accordingly an object of the invention, therefore, to provide a new and improved method of and apparatus for measurement of forces that are immune to disturbing effects of an unsteady mounting or support for the force-measuring apparatus through canceling or elimination of errors caused by such effects in the force measurements.

It is a further object of the invention to provide such a novel method of and apparatus for measurement of forces that are immune to the disturbing effects of movement, in response to changes in the applied force, of the mass supported by the force-measuring apparatus, as well.

Another object is to provide these immunities in a manner that can be conveniently applied to a wide range of circumstances, with characteristics of support and of supported mass which are not beforehand known, but for which the force-measuring apparatus can be easily field-calibrated by the user.

Still another object is to provide an improved touch-input computer or related display employing touch force location, including externally to the display, that is rendered immune to inertial interference effects.

Other and further objects will be explained hereinafter and are more particularly delineated in the appended claims.

SUMMARY OF INVENTION

In summary, from one of its broader aspects, the invention embraces in a touch-input computer and related supported display employing touch force location measurements, a method of eliminating the errors that may be introduced into force and/or torque measurements by undesired inertial interference motions of one or more of the support, mechanical system of the display and/or force measuring apparatus itself, that comprises, sensing one or more components of force and/or torque applied to the display by touch forces to provide force and/or torque measurements uncorrected for inertial interference motion effects that may arise; sensing lineal and/or rotational acceleration of the display in response to such inertial interference motions; and correcting the uncorrected force and/or torque measurements in response to the acceleration sensing to reflect or achieve substantial elimination from the measurements of the effects of such inertial interference.

Other features of the invention and preferred and best mode designs are hereinafter set forth.

Underlying the invention, however, are three related aspects, corresponding to the above-stated objects.

1) Particular accelerometers are incorporated into the force-measuring device in sufficient number and manner to record all relevant degrees of freedom of motion of the support (if attached to the support side), or of the attachment to the unknown force (if attached to the measurement side). A typically different linear combination of these accelerometer channels is added in turn to each channel of uncorrected force measurement, with coefficients of combination chosen such that the resulting sums reflect the desired force measurements, free of error, in the low frequency limit, or in the limit of an arbitrarily stiff connection to all of the supported mass, due to tilting or change of motion of the support.

2) In addition, or alternatively if desired, sets of correction channels are derived corresponding to time derivatives of the uncorrected force measurements, including typically at least the set of the second derivatives, but possibly also sets of one or more derivatives of other orders. A typically different linear combination chosen such that the resulting sums reflect the desired force measurements, free of error due to changing the supported mass, to the extent that the support itself does not change motion.

3) Coefficients of combination for correction channels are determined empirically, in situ. Such correction channels may comprise accelerometer readings, and/or time derivatives of various order of these or of the uncorrected force readings, and/or related quantities of similar value, such as quantities effectively approximating the preceding over a desired frequency range, or linear combinations of any measured data containing the desired acceleration and/or derivative data. The force-measuring device is installed into its normal operating context, which may vary considerably from installation to installation. To calibrate, data are then gathered in the same manner as for normal force measurement purposes, but while the applied unknown force is allowed to remain at zero, and then while the system is intentionally disturbed in various ways. The idea is to gather a reasonably rich collection of measurement sets from moments when forces caused by acceleration of the supported mass are the only ones applied to the measurement side of the device. Disturbances may consist of pushing or shaking the system support in differing directions and patterns while data are gathered and/or pushing or shaking the supported mass at different points and in differing directions; data being gathered after the disturbing force is removed. A correction matrix may now be found, by methods later described, which relates the data collected from the correction channels to that gathered from the uncorrected force channels. The elements of this matrix comprise the desired coefficients of combination to achieve the above-stated corrections.

The invention contemplates that any of these three independently novel aspects may be separately used, or that they may be used in various combinations. The particular preferred application and embodiment described herein benefits indeed from incorporating all three. In this manner, the method and apparatus of my said copending application is significantly improved to work accurately and reliably with a wide range of massive and softly supported computer display monitors. A simple one-time calibration procedure is performed at display installation time, requiring no equipment, and being effectable in less than one minute to complete. For installations that would otherwise be plagued by large inertial effects, the typical performance improvement achieved is a factor of about thirty times reduction in error of reported touch location.

BRIEF DESCRIPTION OF THE DRAWINGS

The invention will now be described with reference to the accompanying drawings, FIG. 1 of which is a side elevation showing an illustrative application in which the preferred embodiment supports a computer CRT display monitor for purposes of user touch location as described in my said copending patent application;

FIGS. 6a–e illustrate the definition of vector and matrix quantities needed to interpert the system in three dimensional space, with successive FIGS. 6a–e showing different components of the measurement matrix;

DESCRIPTION OF PREFERRED EMBODIMENT

Figure 4:
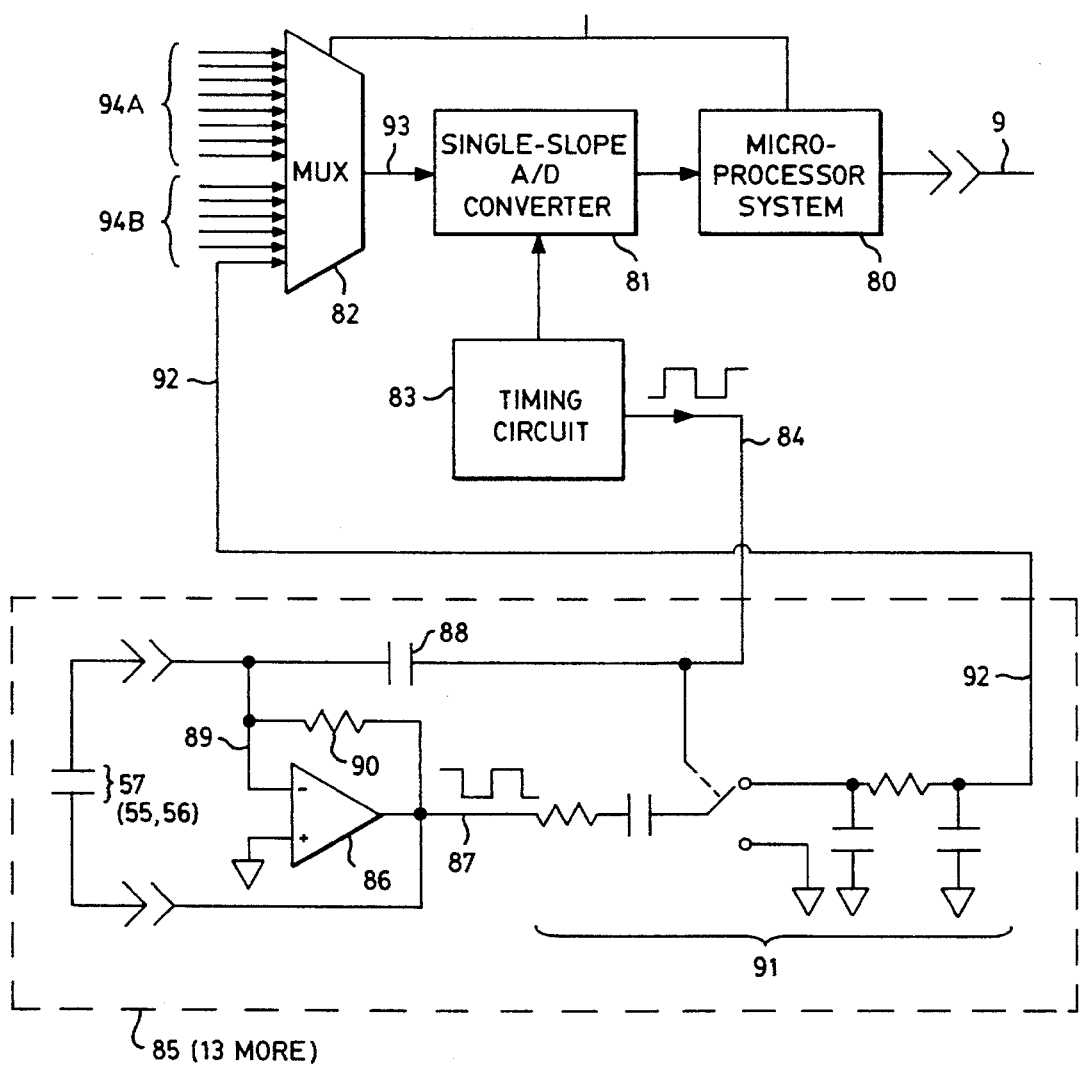
FIG. 4 is a simplified schematic diagram of electronic conversion and calculating circuitry suitable for the system of the invention.

The preferred embodiment embraces the system of my said copending application, now modified to incorporate the improvement of the current invention. These improvements, as before summarized, reside in the novel type and arrangement of accelerometer capacitances as additional input channels, as shown in FIG. 4; and the extension of the firmware processing performed in the microprocessor system to support the method of the invention, as flow-charted in FIG. 5. In addition, the static sensor channels have been increased in number and the associated sensors relocated to the corners with pairs of horizontally mounted coil springs now employed.

Figure 1:
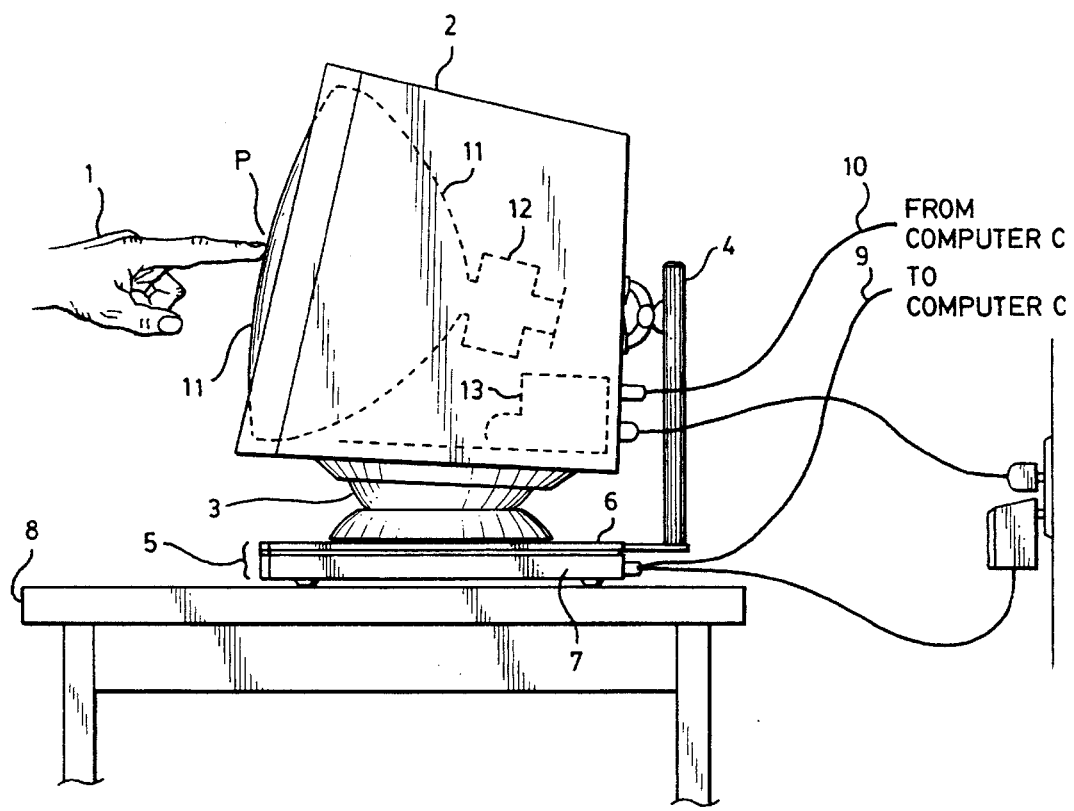

FIG. 1 depicts the force and torque sensing platform 5 in use as a computer touch input device for locating and otherwise measuring touches delivered to the display device 2, shown as a CRT display monitor 11. The touch force generated by the user's hand 1 at point P passes through CRT display monitor 2, then in parallel through a tilt-swivel base 3 and stabilizer bar and bracket 4 provided with platform device 5 to a top plate 7 and the supporting table 8 resting upon the floor. Calculations performed within 5, transform force and torque measurements into touch location coordinates, which may be passed to a controlling computer via cable 9. The controlling computer may then respond, via cable 10, with some alteration of the display image, such as brightening the image of a pictured push button whose coordinates have been touched.

Before proceeding to a discussion of the features of the invention, a summary orientation of the force-measurement technique disclosed in my said copending application (also incorporated herein by reference) may be useful; through the improvement of the present invention is separate therefrom and useful also with other types of force-measurement systems as before explained.

Returning, now, to the inertial interference suppression, cancellation or elimination concepts of the present invention, the stabilizer bar and bracket of FIG. 1 was provided primarily to prevent overt motion within the tilt-swivel base 3, such that once the user has set the desired orientation of the monitor, there will be a fixed spatial relationship between the face of CRT 11 and the platform device 5.

The bulk of the supported mass resides in the rigid CRT II and its attached yolk assembly 12. Additional smaller mass concentrations are found in the monitor electronics and power supply 13, and platform top plate 6, and a small amount is distributed throughout the plastic housing and base. Significant elastic compliance is found in monitor housing 2, the platform device 5 itself, and especially in the tilt swivel base 3. Stabilizer 4 provides some useful stiffness in parallel with 3, but not enough to reduce motions to insignificance. Given a perfectly stable bottom plate 7, the predominant two eigenmodes comprise rotations of the supported mass about horizontal axes passing slightly below the center of 3; one typically passing fore-aft, and the other left-right. The associated frequencies are close but not identical, and fall near 3 Hz for large, softly mounted monitors. As the relative importance of mass varies with the square of the distance from the axis, the CRT and yolk assembly strongly dominate these modes. Numerous other eigenmodes reside at higher frequencies, some associated with motions accurately modeled by a single, dominant, rigid mass, and some not; but all high enough in the application of this embodiment for linear filtration to suffice for removal of their disturbing effects.

With acceleration readings available and properly exploited for motions of bottom plate 7 (or top plate 6), it has been found that the corrections relevant to the internal motions of the monitor/platform device system are mathematically identical to those for a motionless bottom plate as later explained. In the abscence of accelerometers, however, motions of the bottom plate 7 and table 8 must be explicitly considered. Folding tables typically allow large side-to-side shearing motion. Some varieties allow equally great motion front-to-back. Shelves and computer tops often allow large front-to-back nodding motion, due to torsion of the support surface. Resonant frequencies run 2 Hz to 4 Hz and are very easily excited, as are non-resonant motions during ongoing disturbance.

Figure 2A:
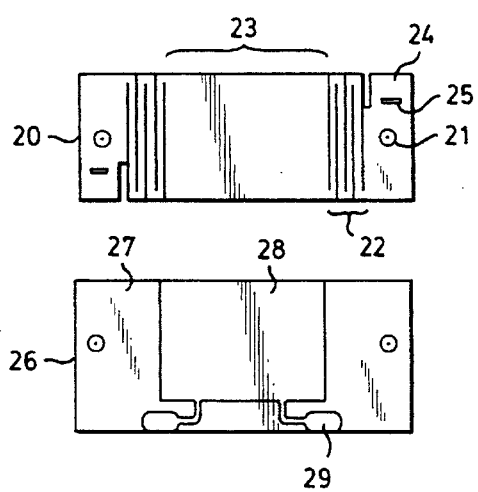
FIGS. 2a and 2b illustrate the design of an appropriate accelerometer for use with the invention, in plan and exploded views, respectively.
Figure 2B:
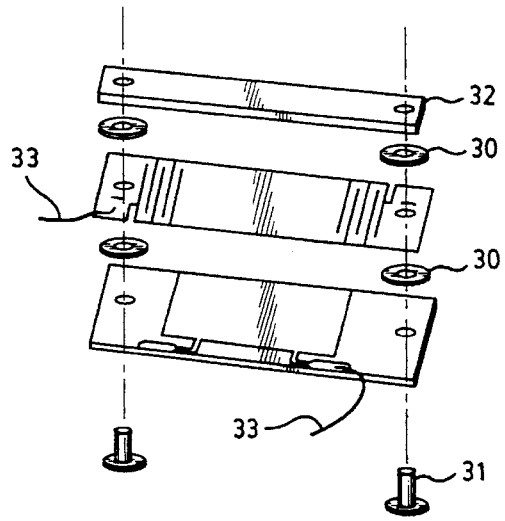

FIG. 2a depicts the major elements of a preferred accelerometer of suitable design for the particular purposes of the present invention, which is shown in exploded assembly in FIG. 2b. A berillium-copper foil 20 is etched or punched to the retangular outline shown, with mounting holes 21 and skits 22 formed in the same operation. Spring action resulting from slits 22 provides region 23 with mobility perpendicular to the foil plane. Tabs 24, thermally isolated by slits 25, provide access for soldered or welded electrical connection. A single-sided PC board 26 comprises an insulating laminate 27 bearing conductive foil region 28, which serves as a capacitive counter electrode to region 23 of the free-standing foil 20. Contact areas 29 are accessible along a thin strip not covered by foil 20 after assembly. Elements 20 and 26 are held in opposition by spacing washers 30 and tubular rivets 31, with overtravel protection provided by a punched laminate bar 32. Wires 33 provide connection to the measuring electronics, and are typically routed somewhat apart, so as to minimize stray capacitance there between. The measuring system chosen, however, is largely unaffected by stray capacitance to the grounded enclosure. The dimensions and thickness of foil 20 are chosen to provide a resonance of 23 Hz. This is high enough to provide good fidelity in rendering acceleration below 5 Hz, yet low enough to avoid excessive aliasing energy within 5 Hz of the sampling rate.

The resonant frequency is associated with a particular distance such that region 23 sags under its own weight when the assembled accelerometer lies horizontally. The thickness of washers 30 is chosen to be about half again this distance. The area of opposed conductors 23 and 28 is chosen to give an operating capacitance range directly compatible with that of the main sensors (55 opposing 56 in the upper and lower force-sensing platform castings of FIG. 3, later more fully described). The application at hand requires accelerometers with response free of significant amplitude or phase error from about 0.1 Hz to about 5 Hz. The DC response characteristic of the design chosen for this embodiment is very helpful in this regard. Although DC coupling and capacitive technique are convenient here, it should be noted that the method of the invention may employ acceleration responsive sensors of a wide variety of other types and principles of operation, if desired.

Figure 3:
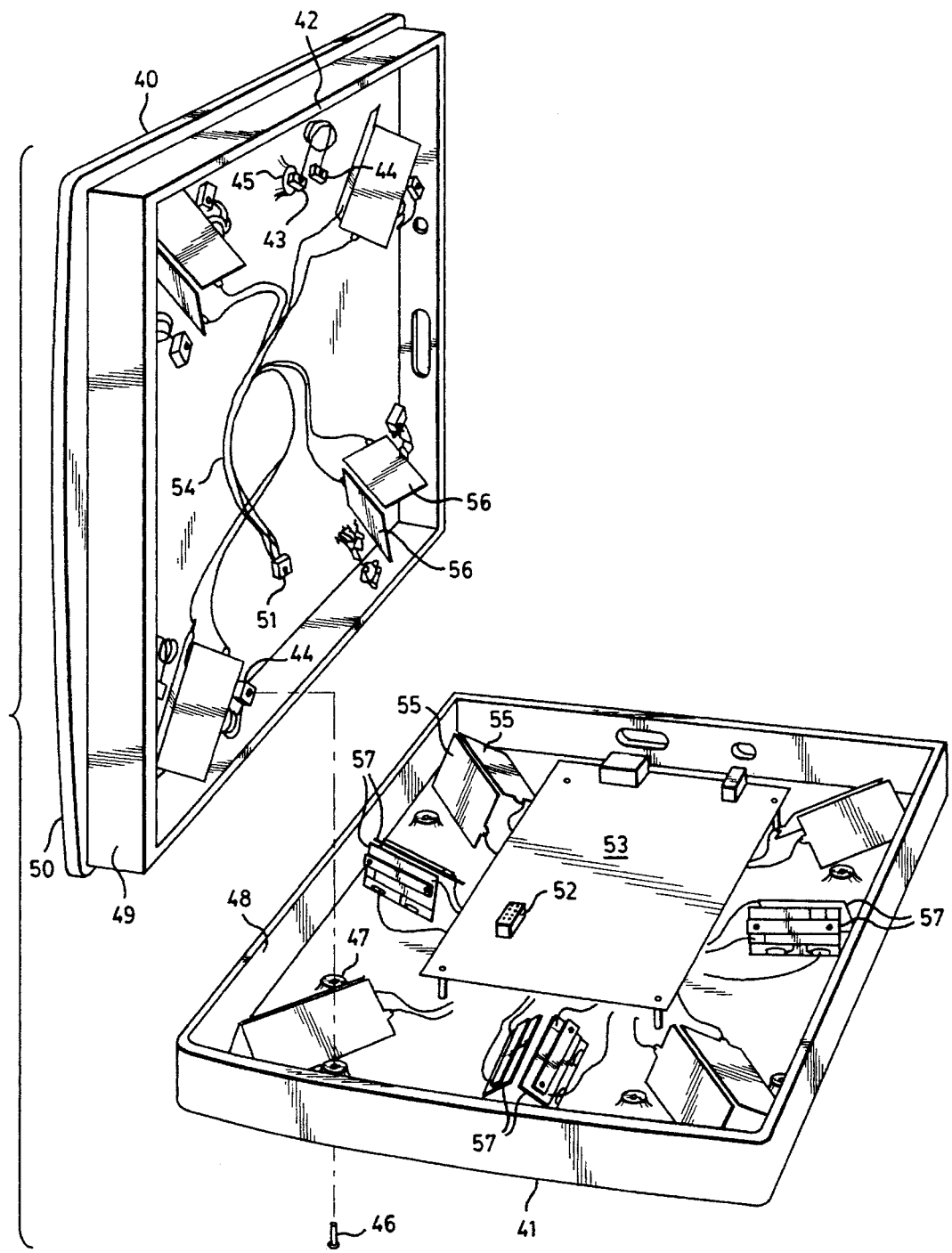
FIG. 3 is an isometric view showing the disposition of components within the force-sensing platform, employing the accelerometer improvement.

FIG. 3 depicts the force-sensing platform 5 seperated into its top plate casting 40, and bottom plate casting 41, each with its associated sub-assemblies. Eight springs 42 have pressfit upper and lower still attachments 43 and 44 respectively. Upper attachments 43 are held to bosses 45 by self-threading screws (not shown), with screws 46 (one shown) passing through lower casting bosses 47 into threaded lower attachments 44. When thus assembled, and with connector 51 attached to circuit board 53 through mating connector 52, the platform top plate and monitor are supported entirely through springs 42, the stiffness of wires 54 and additional supported monitor cables, such being insignificant compared to that of springs 42. Lower flange 48 surrounds upper flange 49, with lip 50 covering what would otherwise be an upward opening gap. This arrangement prevents incidental contact with keyboard, cables, or other small tabletop objects from passing extraneous forces to the top plate 40. Capacitive sensors of displacement (and thereby of force) are located in pairs in the corners, each comprising the before-identified lower plate 55 which opposes an upper plate 56 upon assembly. The capacitor sensor plates 55 and 56 comprise conductive foils on insulating subtrates. These sixteen substrates, plus the six accelerometer modules 57, are preferably adhesively mounted to 45-degree casting bosses, not shown.

The six accelerometer modules 57 are the important elements of FIG. 3 that pertain to the operation of the present invention. These are mounted in pairs, as shown, with axes of sensitivity inclined 45 degrees to the vertical, and each 90 degrees to the opposite member of its pair. The pairs are positioned to approximate the vertices of an equilateral triangle, and are turned to make the axes of sensitivity lie perpendicular to a line drawn from the triangle center. In practice, minor adjustments to this pattern may be made to avoid interferences. The triangle is made as large as may be accomodated within the base, to acheive a balance relationship between the rotational and translational sensitivities of the ensemble. This arrangement of accelerometer positions and orientations is, of course, only one of many, which will be evident to one skilled in the art, that share the advantage of encoding the six degrees of freedom of rigid acceleration with excellent linear independence.

A simplified schematic of suitable electronic conversion and calculating means for effectuating the functions of the invention is presented in FIG. 4, the circuits being carried on circuit board 53 within the platform device 5. This is similar to that used in my copending application and need not therefore be described in great detail. Circuits 85 and the multiplexer inputs 94 have, however, been increased in number (to fourteen), to accomodate the six accelerometer channels 94b and eight displacement/force channels 94a. Timing circuit 83 has been modified to provide somewhat higher frequencies, such that forty complete conversions of all fourteen channels may be completed every second. Finally, microprocessor system 80 has been enhanced with firmware to develop timederivative correction channels, and to employ accelerometer and time derivative correction channels to improve force and touch location data made available over communications cable 9, FIG. 1. The capacitance 57 in circuit 85, furthermore, will be replaced by 55 and 56 for the inputs 94a.

Figure 5:
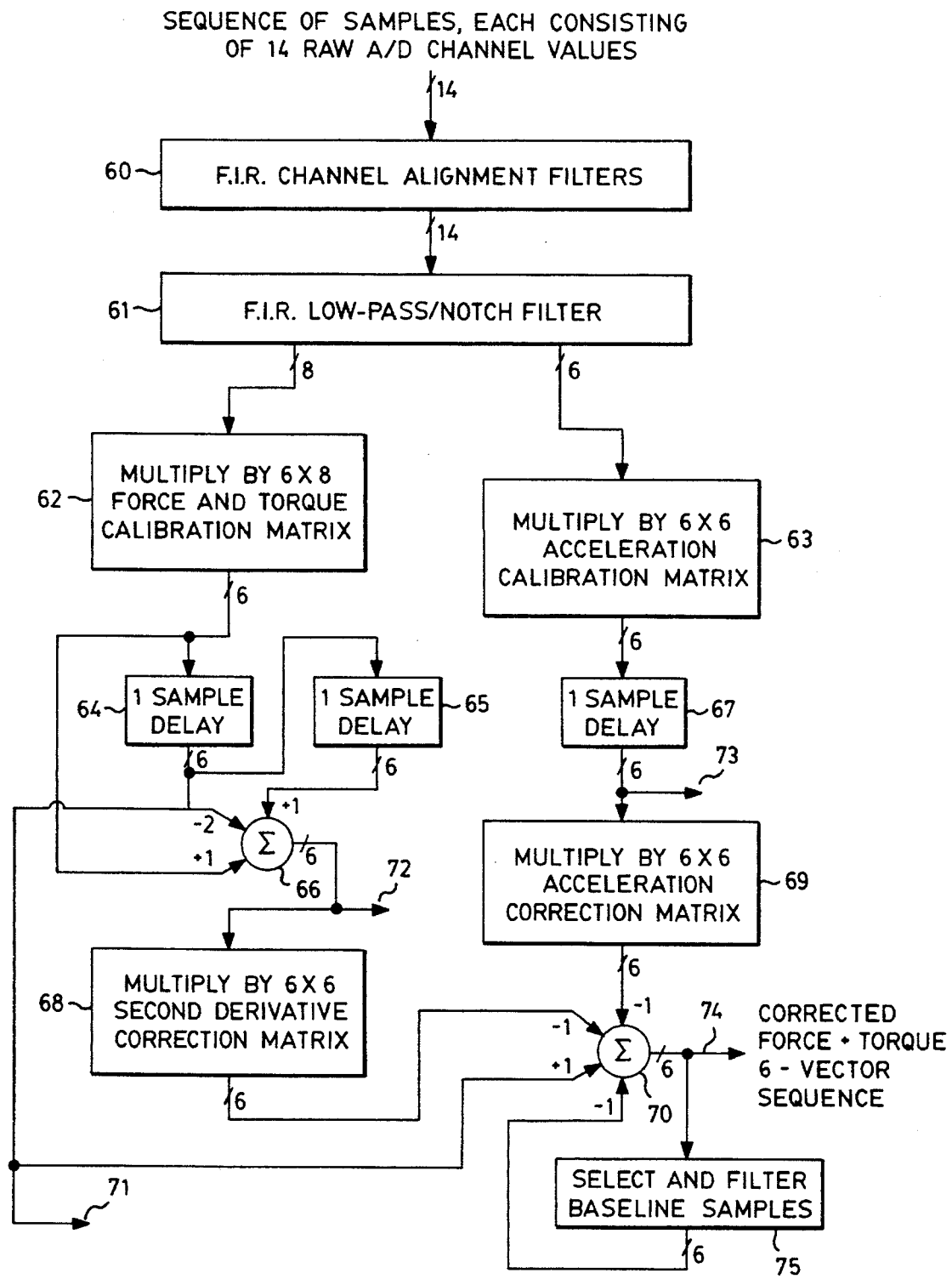
FIG. 5 provides a flow-chart of the firmware operation of the preferred embodiment.

It is now in order to explain how circuits and components operate to obtain the desired functions. In FIG. 5, a flowchart of firmware is presented that may be used in the microprocessor system 80 to transform the sensor input data into force and the torque substantially free of inertial error. The subsequent processing to yield touch location coordinates, as described in my said copending application, is not germaine to this operation and therefore not repeated in this application.

The conversion methods of FIG. 4 sample the fourteen input channels at fourteen different points in time, more or-less evenly spaced throughout the interval of one full sample cycle. Within each fourteenth of a cycle, the exact moment of measurement depends somewhat on the actual value measured. The resulting differential group delay is removed by processing step 60. Step 60 may comprise fourteen different two-tap finite impulse response ("F.I.R.") filters, each performing a linear interpolation of the two most recent component values to a common equivalent sample time. At the cost of slightly greater total delay, three-tap quadratic interpolating filters may be used to acheive substantially less differential amplitude response.

In step 61, FIG. 5, by contrast with step 60, the same response is employed in each of the fourteen filters. This response is designed to remove frequencies above about 5 Hz. In one embodiment, for example, 12 tap coefficients form a triangular impulse response, comprising six values in descending sequence. This is equivalent to successive applications of a six-wide and a seven-wide square impulse response filter, which give notches at, for example, 5.7 Hz, 6.7 Hz, and integral multiples of these. As noted in my said copending application, a linear filter which is applied uniformly to all components of the applied force and torque vector leaves the computed location of force application unaffected, except for possible delay in response. Further, the linear nature of the processing steps in FIG. 5 provide that the uniform application of a given filtering characteristic to all channels in step 61 is equivalent to applying the same characteristic instead to the six channels output from 70, insofar as final output 74 is concerned.

The compensatory differential filtering of step 60 is thus provided first to assure that the effective aggregate filtering of all channels is identical, and then an additional common characteristic is introduce in step 61 to remove frequencies higher than needed for adequate response speed, which frequencies may also be too high for accurate handling under certain simplifying assumptions exploited by Later processing steps (such as the use of second central difference to approximate the second derivative.)

Following step 61, the eight channels responsive to the force sensors are standardized by linear transformation 62, and the six channels responsive to the accelerometers are standardized by linear transformation 63. These transformations are assigned the task of compensating for mechanical and electronic component variation from one particular platform device to the next, so that if multiple devices are used in a set of identically configured installations, the installation specific calibration data may be identical across the set. Transformation 62 has an additional task of reducing the eight force sensor channels to six, in such a manner as to eliminate the effect on any of these channels of distortion of the mechanical structure of the platform device. The forty eight coefficients of combination required by 62, and the thirty six required by 63, are determined by a factory calibration procedure and stored in a non-volatile memory which is part of the microprocessor system 80. The matrix of coefficients for 62 may be described as in my said copending application. Determination of the matrix of coefficients for 63 is simplified by the fact that the only significant source of variation resides in the overall scalar sensitivity of each channel, as opposed to the position and direction of its axis of sensitivity. These channel sensitivities may then be determined by supporting the platform device briefly at each of two fixed angles, and noting the differing effect of the acceleration of gravity on each channel for the two cases. A diagonal matrix comprising the ratios of the expected differences to the observed differences may then be used for 63. Alternatively, 63 may be the product of this diagonal matrix with a fixed matrix describing a transformation to familar rectangular coordinates.

The six components of the most recent previous output of 62 are held in delay 64, while the second most recent are held in delay 65. Combiner 66 sums, component by component, the current and doubly delayed outputs of 62, while subtracting twice the singly delayed output, yielding second central difference signal 72. Delay 67 is provided to match the group delay of forming the second central difference, such that the signals 72 and 73 remain accurately aligned in time. The second central difference, before mentioned, is employed as a good low-to-medium frequency approximation to the true second derivative, with the advantage of small group delay. Five or seven point approximations may be used in other embodiments for accuracy to higher frequency, but at the cost of greater response delay. The uncorrected force readings, available with the appropriate degree of delay from 64, then pass to combiner 70, wherein corrections from transformations 68 and 69 remove the inertial interference signal. The coefficients of combination 68 and 69 are determined in an installation dependent manner by a user calibration procedure, performed in conjunction with a software program executed on the controlling computer with which the platform device communicates. At the end of this procedure, coefficients calculated within the controlling computer are passed to microproccesor system 80 for storage in its non-volatile memory.

The touch locating application for which this embodiment is intended involves a series of short term measurements of changing forces, separated by periods of quiescence. An "auto-zeroing" feature 75 can therefore provide economy by relaxing the requirement for long term stability against measurement offset drift. A variety of heuristics may be employed for determining quiescence, such as the failure of a number of most recent samples to contain any components with a range of variation exceeding a certain minumum. Quiescent samples identified in this way (all of whose components should nominally be zero) are accumulated into a set of baseline values. These baseline values are presented continuously to combiner 70 for subtraction of static offset from outputs 74. By accumulating only a fraction of each quiescent sample into the baseline values, a simple recursive filtering effect may be obtained which prevents the auto-zeroing logic 75 from degrading the signal-to-noise ratio of outputs 74.

CALIBRATION PROCEDURE

The calibration procedure for transformations 68 and 69, FIG. 5, is performed as follows:

At installation time, the user loads and executes a software program supplied with platform device 5 on the controlling computer C to which it is attached. This program, so operating, is able to pass operating instructions and action acknowledgements to the user through display device 2. The initial steps of this program include establishing communication with platform device 5 through cable 9, FIG. 1, and instructing the device to enter a calibration mode in which all components of signals 71, 72, and 73, FIG. 5, are streamed to the controlling computer, rather than the usual touch location information. The program then monitors the three translational components of signal 71 for a short while, to establish their quiescent zero points. The squared magnitude of applied translational force is thereafter obtained from the sum of the squares of the deviations of these three components from their zero point levels.

The program next leads the user through a series of four to six mechanical disturbances of the system, during which it gathers a matrix of twenty four to thirty six measurement vectors, of eighteen components each, from which transformations 68 and 69 will be calculated. For the first four disturbances, the user 1 is instructed to apply finger pressure P at certain approximate locations on display monitor 2, FIG. 1. In each case, upon detecting an applied translational force of appropriate magnitude and stability, the user is prompted to remove his finger abruptly, and keep it off until instructed to proceed to the next location. During the first second after release, six measurement vectors are taken from the forty or so available and are retained for later processing. The interval between successive retained measurements is increased from five to nine samples over the interval, to eliminate the chance, for some resonance, of strobing only zero crossings. Simultaneously, a running sum is kept for the sample values of each component during the interval. After the six measurement vectors have been gathered, they are each diminished by the average vector obtained by dividing the running sum vector by the number of samples summed.

After further fluctuations in the uncorrected translational force samples have died away to a low level, the user is instructed to continue with the next location. The four locations and directions of finger pressure prior to release are typically as follows: the top right corner of the monitor 2 pressing toward the rear; the top left corner pressing toward the rear; the top right corner, around to the side pressing to the left; and the bottom right corner, around to the side pressing to the left. However, neither the number nor the positions of the locations actually used is critical. What is needed is a sufficient number of measurements of non-zero free motion of the system, in which each easily excited eigenmode (or more precisely, conjugate eigenmode pair) makes a number of contributions to different measurement vectors at randomly differing amplitudes and phases. In addition, the number of data elements gathered from correction channels (components of 72 and 73, FIG. 5) should substantially exceed the number of coefficients to be determined, so that full constraint of the latter may be insured, despite the stochastic nature of the independence of eigenmode representation.

In addition to the twenty four free-motion vectors so gathered, an attempt is made to add two more groups corresponding to motions driven from the support side.

The user is instructed to shake the table gently from left to right. A group of six measurement vectors is collected, as above, except that collection commences as soon as the program detects a sufficient level of disturbance, and the user is instructed to continue shaking through the measurement interval. If sufficient disturbance is unavailable with gentle shaking, the program will offer no immediate acknowledgement—a condition to which the user has been instructed to respond by pressing a key on the controlling computer's keyboard. Finally, instructions are given to repeat this process by shaking from front to back. The driven measurements collected in this manner show response to frequencies not constrained to the eigenfrequencies of free motion; they may be particularly helpful in constraining the coefficients of acceleration correction matrix 69.

Were the support soft enough to allow slow, substantial motion in all six degrees, the associated measurement vectors would together tightly constrain all aspects of transformation 69. Few tables of any kind, however, allow significant motion in vertical translation. Similarly, the "visible" (i.e., it affects the measurements) excitation of all eigenmodes corresponding to the principal supported mass would fully constrain transformation 68. Yet the presence of filter 61 virtually assures that at least some of the higher frequency modes will be invisible in the data. Nonetheless, effective coefficients for transformations 68 and 69 can be found from the measurements vectors collected as described above, in the sense that they correct well for the disturbances actually occurring in the installation at hand, while manifestly having no need to remove disturbances never found in the data.

After completion of the measurement-collecting phase, the calibration program enters a calculating phase, during which it finds such coefficients for 68 and 69. These are then transmitted to platform device 5 for storage in the nonvolatile memory of microprocessor system 80.

At this point, the program may proceed to determine static calibration coefficients necessary for touch force location, as described in my said copending application.

Consider the equation $$f_c = f_u - A \ddot{f}_u - B a, \qquad (1)$$

where "$f_c$" and "$f_u$" denote force measurement six-vectors 74 and 71, corrected and uncorrected for inertial errors, respectively; where "$a$" denotes acceleration six-vector 73; where "$A$" and "$B$" denote the six by six constant matrices 68 and 69, and where the number of dots placed over an instance of a variable quantity denote the order of time derivative with which the variable is taken in the instance. Equation 1, then, closely approximates the calculations of FIG. 5 subject to the bandwidth limitation intentionally placed on all variables.

It has been determined empirically that matrices "A" and "B" may be found such that "$f_3$" very much more closely approximates the true unknown applied force "$f$" than does "$f_u$". It is also demonstrated in the hereinafter presented analysis, that this is a reasonable expectation. Where, as for the calibration measurement vectors, the applied force "$f$" and the desired estimate of it "$f_c$" may both be taken to be zero, we have the condition:

$$f_u = A \ddot{f}_u + B a. \qquad (2)$$

"C" is defined to be the six by twelve matrix formed by appending the rows of "B" after the corresponding rows of "A". There may be "$n$" measurement vectors in a calibration set collected as described.

Assume that a six by "$n$" matrix of uncorrected force readings "$R_u$" is formed by taking the first six components (derived from 71, FIG. 5) of each measurement vector, in order, as a column of "$R_u$". Let twelve by "$n$" matrix of correction channel readings "$R_{cc}$" be formed by taking the the last twelve components (derived from 72 and 73, FIG. 5) of each measurement vector, in order, as a column of "$R_{cc}$". Then we have:

$$R_u = C R_{cc}. \qquad (3)$$

In general, no "C" will exactly solve equation 3— it is inconsistently overdetermined, due to redundant but slightly noisy data. Yet many will very nearly do so, since "C" is at the same time underdetermined, in that some modes of disturbance are represented poorly or not-at-all in the calibration data. Thus we must look for a best fit "C", but not usually the one that gives the absolute minimum residual on the determining data. Rather, we wish to find that matrix to use for "C" which minimizes the expected value of the sum of the squares of the components of the error matrix "E" for:

$$E = R_{u2} - C R_{cc2}, \qquad (4)$$

where "$R_{u2}$" and "$R_{cc2}$" constitute a second set of independently determined calibration data on exactly the same installation, but with "C" determined from the original calibration data "$R_u$" and "$R_{cc}$".

We begin from the singular value decomposition of "$R_{cc}$":

$$R_{cc} = U W V^T, \qquad (5)$$

where column orthogonal matrices "U" and "V", and diagonal matrix "W" have the usual definitions, and the calibration program calculates these using standard methods. The calibration program then obtains "C" from:

$$C = V W_z^{-1} U^T R_u. \qquad (6)$$

"$W^{-1}$" may be obtained from "W" by replacing each diagonal element "$w_{ii}$" with its scalar reciprocal "$1/w_{ii}$". "$W_z^{-1}$" is obtained in a similar manner, except that zero is substituted for "$1/w_{ii}$" for each singular value "$w_{ii}$" which is too small. By "too small" is meant a determination assigned heuristically by the program to any singular value which is smaller than a certain percentage (such as one percent) of the greatest singular value, or which has an absolute value too close to the noise floor. This noise floor may be observed in the singular values obtained from data gathered as though performing a calibration, but with measurement groups artificially triggered in the absence of any disturbance. The best heuristics are a function of the application and the exact embodiment, and are determined empirically by repeated trials of differing relative and absolute thresholds; that pair of values is then chosen which actually minimizes expression 4 for multiple independently collected data matrices.

While a serviceable value of "C" may often be obtained by using "$W^{-1}$" for "$W_z^{-1}$" in expression 6, use of the latter provides not only better average correction, but avoids possible problems of overflow due to unexpectedly large coefficients. Additionally, should modes of disturbance poorly excited during calibration ever be strongly excited in practice, the less sophisticated determination of "C" may greatly enlarge the error, where the alternative at least leaves it alone.

THEORY UNDERLYING THE INVENTION

To understand how the method of the invention may be varied in embodiment, and how it may be applied to differing force measurement problems, it is necessary to examine the underlying theory as part of the teaching. To do this, we will examine how lumped parameter mechanical models can be used to analyze the touch location application, both with regards to the correct functional form for inertial correction equations, and with regard to the limits on the accuracy improvement which may be expected.

Mechanical schematic diagrams are usefully employed, such as FIG. 7a, FIG. 8a, and FIG. 9a. While correct equation forms may be readily extracted from these by viewing them as one-dimensional physical diagrams, they become full six degree representations of the three-dimensional problem with correct interpretation of the symbols and associated quantities. Capital letters denote six by six real, symmetric, constant matrices, while lower case letters denote variable six-vectors containing both translational and rotational information. The matrices represent not only all degrees of those parameters normally associated with the component elements (e.g. spring stiffness, mass, moments of inertia, magnitude of damping), but also aspects of relative component position, such that in conjunction with these matrices, the diagrams need convey only the topology of interconnection to fully specify the problem.

FIG. 6 assists interpretation of vector-valued variables and model parameters in three-dimensional space. The choice of reference system for these quantities is arbitrary, in the sense that the forms of the mechanical circuit node equations, and results derived from them, are independent of the reference system used. Any analysis which requires numerical estimates of the component values, however, must choose a convenient reference system, and then apply that same one consistently to all quantities in the problem. The required reference comprises a set of coordinate axes 100, FIG. 6a, together with a fixed point R in space. Note that axes 100 define not only orthogonal translational degrees "1", "2", and "3", but rotational degrees "4", "5", and "6", the latter three being the outward looking clockwise rotations about the first three, in order. This enumeration order is depicted at 100 as applied to the components of force "f", but applies analogously to all six-vector quantities.

In FIG. 6a, the set of forces 101 acting on rigid body 102 is summarized as to effect, in total state of force six-vector "f". An agent at R, supported by rigid extension 103 from solid support 104, reports in terms of coordinate axes 100, the force and torque components required to maintain rigid extension 105 of body 102 in equilibrium. The negative of these components, enumerated in the order shown at 100, constitute the vector-"f". (Reversing sign reports the force felt, rather than the one applied.) Note that the value of "f", while strongly dependent upon the position chosen for R, is independent of the path of 105 or its point of attachment to 102. Note also that many different force patterns 101 may lead to the same value of "f", but that the effect of any such force pattern on the dynamics of body 102 is completely determined by the value of "f".

FIG. 6b shows rigid body 102 displaced from its equilibrium position "$x_e$" by displacement six-vector "x".

All possible rigid extensions of body 102 define a mobile but rigid auxilliary frame of reference termed a frame of rigid subsystem 102; or, more briefly, the frame of 102. At R, the frame of 102 has been marked with a copy 106 of coordinate system 100. After displacement, the first three components of "x" may be read as the displacement of the marked copy of "R" with respect to "R" itself. Some care is required in addressing the representation of rotations; but in the limit of small displacements, the final three components may be read as that rotation of the original coordinates at "R", about each axis in turn, which brings the other two axes closest to their marked copies. Thus the best aligning rotation about the third axis develops the component "$x_6$", as shown. Alternatively, a rotation vector (not shown) may be defined which points parallel to the axis of rotation in the clockwise direction, with length proportional to angle of rotation about this axis. Components "$x_4$", "$x_5$", and "$x_6$" are then the projections (not shown) of this vector on the first, second, and third coordinate axes, respectively. Importantly, in the limit of small displacements, the sum (component by component) of two displacement six-vectors accurately reflects the compounded displacements.

Figure 6E:
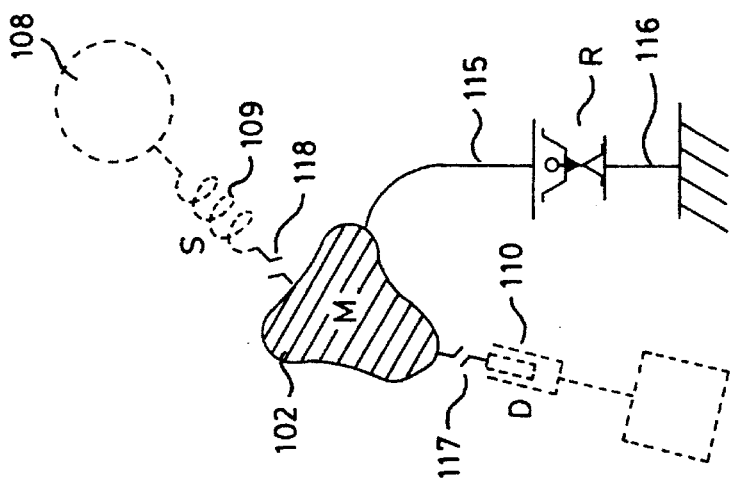
Figure 6D:
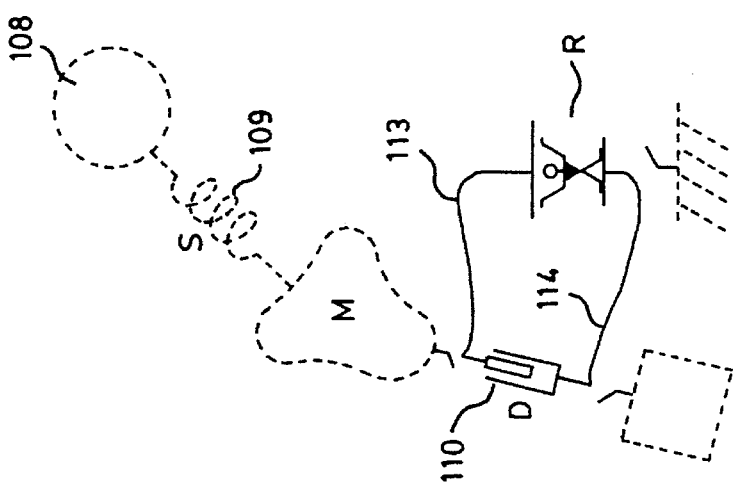
Figure 6C:
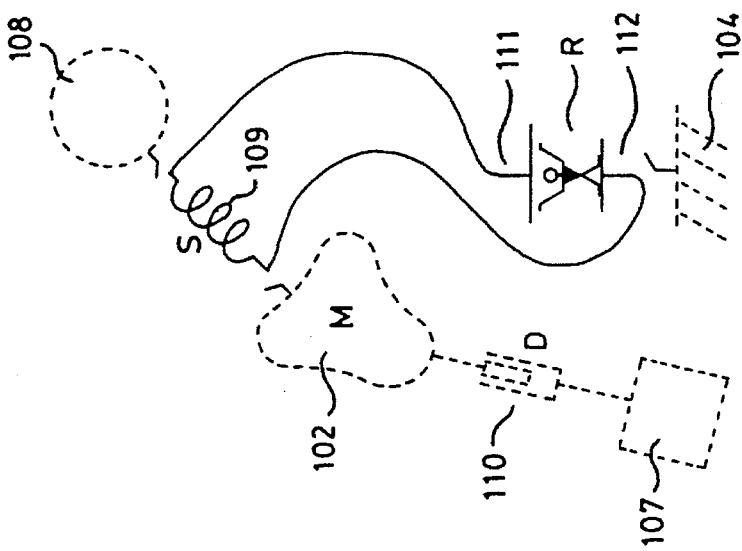

In FIGS. 6c, 6d, and 6e, a mechanical system is shown composed of rigid and potentially mass bearing subsystems 102, 107, and 108, coupled by massless elastic element 109, with characterizing matrix S, and massless viscous dissipation element 110, with characterizing matrix D. For brevity, elements such as 109 are termed springs, and elements such as 110 are termed dashpots; these terms imply nothing, however, as to the physical form of the elements in question. The spring symbol at 109, both here and in the schematic diagrams to follow, is taken to denote the presence of stiffness in all six degrees, not just along the axis of the symbol. Also, it may be a summary representation of the effects of a number of physically distinct elastic bodies which interconnect the rigid subsystems (e.g. 102 and 108) to which it attaches. Analogous comments apply to the dashpot symbol at 110. Note that while later diagrams are purely schematic, FIG. 6 is partly geometric for expository reasons. In FIGS. 6c, 6d, and 6e, spring 109, dashpot 110, and mass 102 are dissected free of the rest of the system, and connected with massless rigid extensions for measurement of their matrix parameters "S", "D", and "M" as seen at R.

Returning to FIG. 6c, the agent at R imposes small static translations or rotations of 111 with respect to 112, in each case along one of the six degrees of coordinates 100, while at the same time applying whatever forces and torques are necessary to preclude motion along any of the other five. In each case, the force six-vector felt (or change in force six-vector felt, if the initial position is not relaxed), divided by the magnitude of the displacement, is entered as that column of the six by six matrix "S" corresponding to the number of the component displaced. It follows from this definition, then, that if "x" is a displacement six-vector of 111 with respect to 112, from an initial equilibrium position, then the force six-vector felt through 111 is given by the product "S x". Since "S" is necessarily symmetric, this is also the product "x S". A force "−S x" is felt through 112.

In FIG. 6d, similarly, the agent at R imposes three translational velocities and three rates of rotation upon 113 with respect to 114. In FIG. 6e, the agent at R imposes three translational accelerations and three rotational accelerations upon 115 with respect to 116. In both cases, the motions are constrained to one coordinate degree at a time, as in FIG. 6c. As before, coefficients for the matrix columns of "D" may be determined in order, by taking the force six-vector felt for each motion (the negative of that applied), in order of degree, and dividing its components by the magnitude of the velocity applied. Coefficients for the matrix columns "M" may be determined in order, by taking the applied force six-vector for each motion, in order of degree, and dividing its components by the magnitude of the acceleration applied. Like "S", "D" and "M" are also always symmetric matrices.

"S" and "D" are defined through "felt" forces, while "M" is defined through the forces "applied". This leads to a sign convention in which the diagonal components of "S" and "D" are negative, but also one in which terms in node equations of the general form "f=M a" are all conceptually of positive sign. Actual negative signs appear only in writing terms for which the available displacement variable is used in a negative sense; that is, it describes the motion of some other node with respect to the node of interest.

In the intact and excited mechanical system, let "x" be the six-vector displacement from static equilibrium of 108 with respect to 102, let "y" be the six-vector displacement of 102 with respect to 107, and let "z" be the six-vector displacement of 102 with respect to the inertial frame of R, 104. Then all of the forces acting on rigid subsystem 102 are the force six-vector exerted by 109 on 102, which has the value "–S x", and the force six-vector exerted by 110 on 102, which has the value "D $\dot{y}$". The total force acting on 102 necessary to explain the observed acceleration of 102 is "M $\ddot{z}$".

Thus the node equation for rigid subsystem 102 may be written:

$$-S\ x + D\ \dot{y} = M\ \ddot{z} \qquad (7)$$

In similar manner, equations for all the nodes of any lumped parameter system may be writting These may be solved to provide a description of the system dynamics, wherein combinations of force six-vectors of interest and their time derivatives of various orders are equated to combinations of dispacement six-vectors of interest and their time derivatives of various orders.

This completes the analogy between the six-vector desciption of six-degree per element mechanical systems and the usual scalar valued interpretation of the equations of linear system theory, allowing the extensive results of the latter to be brought to bear on the more compact six-vector notation. (In scalar form, the equations are approximately thirty six times as voluminous.)

Figure 7:
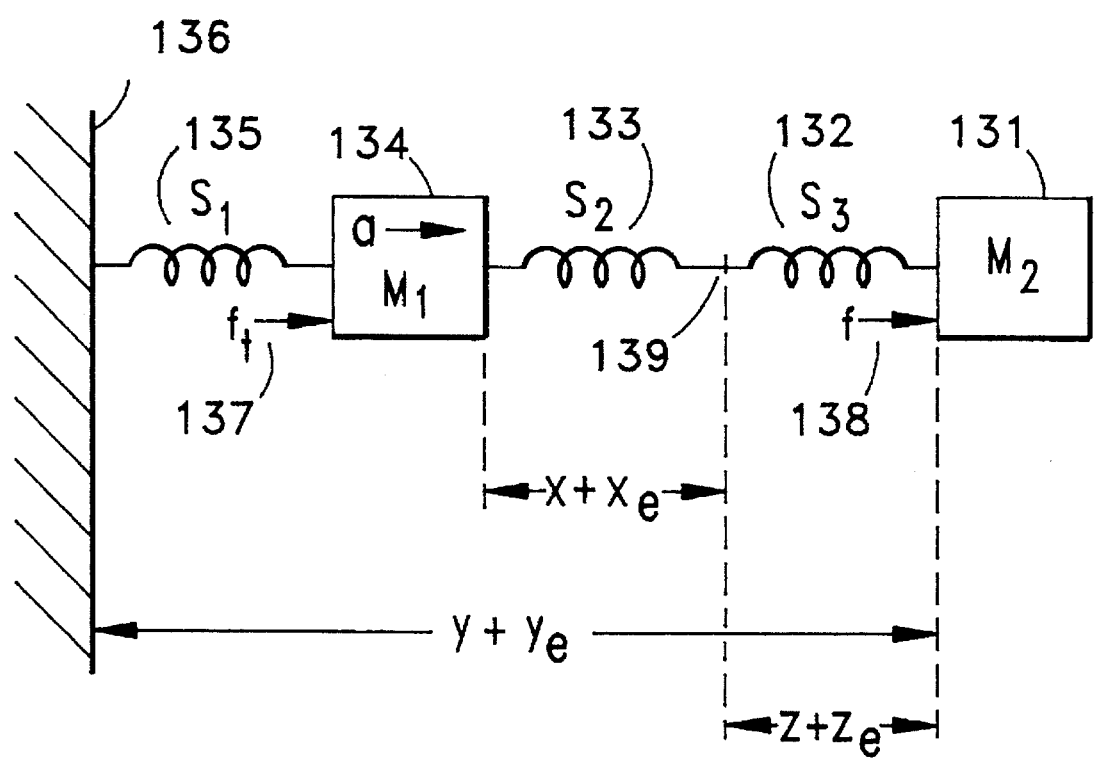
FIG. 7 is an equivalent schematic representation model of the application system of FIG. 1, including those model elements relevant to operation of the preferred embodiment.

It is now appropriate to turn to FIG. 7, which depicts a lumped parameter model which approximates the dynamics of the system of FIG. 1. Platform base 7, the top of table 8, and any other objects supported by 8 are considered to form a rigid subsystem which is node 134 (with mass matrix "$M_1$"). Display monitor 2, exclusive of its tilt-swivel base, is considered to form a rigid subsystem which is node 131 (with matrix "$M_2$"). The legs of table 8 are considered to be an elastic coupling 135 (with spring matrix "$S_1$") between node 134 and solid floor 136. Elastic coupling 133 (with matrix "$S_2$") represents the joint effect of the eight springs 42. Elastic coupling 132 (with matrix "$S_3$") represents the joint effect of tilt-swivel base 3 and stabilizer bar 4 of FIG. 1. Platform top 6 is considered to form a rigid subsystem which is node 139. This is taken for the time being as massless, as are bodies forming elastic couplings 132, 133 and 135. The force "f" to be measured acts upon monitor node 131, while interfering force "$f_i$" acts on tabletop subsystem 134. The available data comprise the displacement six-vector "x" of subsystem 139 with respect to subsystem 134, and optionally, acceleration six-vector "a" of subsystem 134. In most actual embodiments, of course, available data are invertible memoryless transformations of these.

The following further equations 7b through 7g may then be derived, being first expressed below and then explained:

7b) $f_i + S_1\ [y - (1 + S_2 S_3^{-1})x] - S_2 x = M_1\ [\ddot{y} - (1 + S_2 S_3^{-1})\ddot{x}]$ 7c) $f + S_2 x = M_2 \ddot{y}$ 7d) $a = \ddot{y} - (1 + S_2 S_3^{-1})\ddot{x}$ 7e) $f - \overbrace{M_1 S_1^{-1} \ddot{f}}^{142} + \overbrace{M_2 S_1^{-1} \ddot{f}_i}^{143} = -S_2 x +$ $[(M_1 + M_2) S_2 S_3^{-1} + M_2 (1 + S_2 S_3^{-1})] \ddot{x} -$ $\underbrace{M_1 S_1^{-1} M_2 (1 + S_2 S_3^{-1}) \ddddot{x}}_{142}$ 7f) $f = -S_2 x + M_2 (1 + S_2 S_3^{-1})\ddot{x} + M_2 a$ 7g) $f = f_u - M_2 S_2^{-1} (1 + S_2 S_3^{-1}) \ddot{f}_u + M_2 a$ Equations 7b and 7c of nodes 134 and 131, respectively, may then be written without reference to displacement "z". Also, the acceleration "a" measured for node 134 must correspond to model values as shown in 7d.

Manipulation of 7b and 7c yields 7e. This equates a function of unknown forces only, with a function of known displacements only. Combining 7c and 7d, however, gives 7f. This latter equation has simplified dependencies which provide some of the advantages of incorporating accelerometers in accordance with the techniques of the invention.

Since the uncorrected force readings "$f_u$" correspond directly to "$-S_2 x$", 7f may be recast in terms of "$f_u$" as seen in 7g. Equation 7g corresponds directly to the form of previously presented equation 1, thus explaining the excellent results obtained in practice in its application to the system of FIG. 1.

In these equations, the ratio of a second derivative term to the zeroth order term of the same variable (or of fourth order to second) is always seen to give a "coefficient ratio matrix" with the general form "$M\ S^{-1}$". The quantity "$M\ S^{-1}$" describes the free motions of a system consisting of nothing but the mass and spring referred to, the far end of the spring being clamped. The eigenvalues of this matrix are the squared radian periods of the resonances of the mass so supported. Where the matrix is characterized by a single frequency "v", the terms "x" and "$M\ S^{-1}\ddot{x}$" have comparable magnitude when "x" is dominated by components with frequencies near "v". For a frequency of one-tenth "v", however, the zeroth order term dominates the second order term by a factor of one hundred (the second derivative scaling as the square of frequency). In general, though, the matrix has a broad range of eigenfrequencies, and many applications, such as touch location, have significant sensitivity to error from excitation of all modes. It may be concluded as a general rule, then, that the lower order term can be expected to dominate the term of order two higher by at least the square of the ratio of the lowest eigenfrequency of the coefficient ratio matrix to the frequency of interest. As an indication of the relative error in one degree of freedom of the final system output occasioned by omission of a higher order term, this ratio may prove pessimistic by a modest factor, since the system is usually designed for good sensitivity in the sense that typical "x" values have large projections onto that degree's axis in the vector space of "x", while the error components project more-or-less randomly.

The ratio of uncorrected force terms in 7g (or of displacement terms in 7f) describes the resonances of the mass of 131, FIG. 7, with the series connection of springs 132 and 133. Interestingly, these are just the free motions of display 2 in FIG. 1 when the table is absolutely solid. The accelerometers, as used in the present invention, thus have created a virtual solid platform; "$f_t$", "$S_1$", and "$M_1$" have entirely disappeared from view. The acceleration term makes the system immune to inertial interference from the support side, while the second order term makes it immune to interference from motion induced by changes in the unknown force.

In a configuration where the lowest of the resonances just described is sufficiently high, the second order term may be ommited, and the acceleration term retained to deal with table tilt and motion. When the table in reality is solid, of course, the acceleration term (and the accelerometers) may be omitted, and the second order term retained to deal with a heavy monitor on a soft base.

The absence from 7g of constants pertaining to the mechanics of the table means that calibration matrices exist to correct a given installation for all possible support surfaces, the particularities of the installation being limited to the mechanics of the display and its relationship to the platform device. To achieve such a "portable" calibration, however, the procedure described earlier must be performed on a surface mobile enough to allow acceleration in all degrees of freedom that might ever plausibly be seen.

Returning to 7e, it can be seen that even without accelerometers, full correction can be obtained from information impicit in the history of the uncorrected displacement (equivalently, force) data itself, subject to certain restrictions. The most important limitation resides in the absence of any ability to remove error resulting from motion forced through the support. Thus when the table is not very solid, the frequencies associated with coefficient 143 are quite low, and table forces "$f_t$" must be kept very small.

Also, these equations require 135 to be a true linear elastic member, which can be a questionable assumption, due to stiction with, or bumping against, adjacent walls and furniture (the accelerometers mask this assumption). Again, when the table is not very solid, the frequencies associated with coefficient 142 are low; thus corrections from the fourth order derivatives must be made and must be calibrated (which may be done in the same manner as previously described for the other correction channels). Thus also, the calculating means of microprocessor system 80 must be modified to integrate out the second order force term on the left. This requires calibration of coefficient 142. This calibration is still preferably performed by in situ, empirical means, but may require additional steps with known non-zero forces, which may require equipment.

Figure 8:
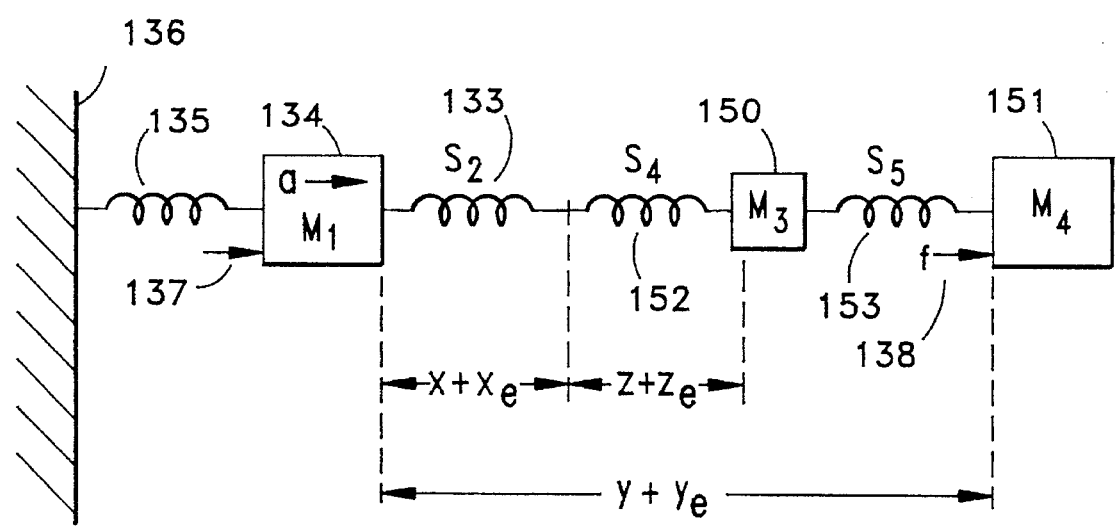
FIG. 8 is a diagram similar to FIG. 7, but with additional details allowing for estimation of the accuracy of correction.

Further refinements and accuracy in achieving the immunity to inertial interference effects in accordance with the invention may be attained with the aid of the somewhat more realistic lumped parameter model of the dynamics of the actual system of FIG. 1 represented in FIG. 8. Node 131 of FIG. 7 has been split into independently moving masses 150 and 151. Node 151 (with mass matrix "$M_4$") represents the CRT 11 and yoke assembly 12 (and such parts of the frame and housing as are best treated as co-moving with 151). Node 150 (with mass matrix "$M_3$") represents the power supply and electronics 13 (along with such parts of frame, housing, stand 3 and stabilizer 4 as are best treated as co-moving with 150). Spring 153 (with spring matrix "$S_5$") has been introduced to describe elastic deformation of the frame and housing of the CRT display between 11 and 13. Spring 132 (FIG. 7) has been replaced by spring 152 (with spring matrix "$S_4$") in recognition of the fact that spring 132 of FIG. 7 implicitly incorporated some of the effects of spring 153. Accelerometer measurements are presumed to be available.

The node equations, presented below as 8b and 8c, lead to force equation 8d.

8b) $S_2 x - S_5[y - (1 + S_2 S_4^{-1})x] = M_3[a + (1 + S_2 S_4^{-1})\ddot{x}]$ 8c) $f + S_5[y - (1 + S_2 S_4^{-1})x] = M_4(a + \ddot{y})$ 8d) $f = \underbrace{-S_2 x}_{158} + \underbrace{[\underbrace{M_3(1 + S_2 S_4^{-1})}_{160} + \underbrace{M_4(1 + S_2 S_4^{-1} + S_2 S_5^{-1})}_{159}]\ddot{x}}_{157} - \underbrace{\underbrace{M_3 S_5^{-1} M_4 (1 + S_2 S_4^{-1})}_{161} \ddddot{x}}_{156} + \underbrace{(M_3 + M_4)a}_{155} - \underbrace{\underbrace{M_3 S_5^{-1} M_4}_{161} \ddot{a}}_{154}$ Two conclusions are drawn from equation 8d. One is that in some applications and embodiments, corrections of greater accuracy may be achieved within the method of the invention by including corrections from higher order derivatives of the uncorrected force measurements, and/or from derivatives of the accelerometer measurements. In this instance, calculation and calibration may be performed exactly as previously described, except for the necessary widening of matrix "C" and heightening of "$R_{cc}$".

The second conclusion is that the errors of the FIG. 7 model corrected in FIG. 8 are quite minor, and that for the actual application of FIG. 1, a scheme more elaborate than that of equation 7g is probably not justified. First, consider the sub-terms 159 and 160 (equation 8d) that comprise the coefficient of second order term 157. The ratio of coefficient sub-term 159 to the coefficient of term 158 describes the resonances of node 151 with the series connection of springs 133, 152, and 153. The same ratio for coefficient sub-term 160 describes the resonances of node 150 with 133 and 152 in series. The lowest frequencies associated with 159, then, are much lower than those of 160; partly because the scalar mass of 150 is typically at least several times smaller than that of 151, and partly because the center of gravity of 150 is about three times closer to the center of rotation of its effective spring. Lowest frequency modes in both cases are primarily rotations about the spring centers, and depend upon moments of inertia that scale with the square of the center of gravity to spring center distance. The coefficient of 157 is thus dominated by 159, and the ratio of the coefficient of 156 to this is then close to expression 161. Since the mass of 151 is substantially larger than that of 150, the ratio of the coefficient of 154 to that of 155 is also approximated by expression 161. These two ratios determine the importance of terms 154 and 156, the two terms that are outside the original form of equation 1. The mass of the power supply, electronics, etc. is relatively low, and the stiffness of the housing and frame is relatively high, especially in the sense of there being no axes of spring rotation passing far from the center of gravity of 150 to create low frequency torsional modes. The lowest frequencies associated with expression 161 are therefore found to be in the range of tens of Hz. The principal frequencies involved in locating even very rapid touches are in the vicinity of two to three Hz for the preferred embodiment. Thus correction terms 154 and 156 are roughly one hundred fold smaller than those already allowed for in equation 1.

The approach of FIG. 8 may also be used to evaluate the effect of bodies other than the power supply, to see if the failure of their mass to move rigidly with that of the CRT might require corrections outside the original form of equation 1. In the application of FIG. 1, the top plate 6 is the only other candidate for a mass of significant effect. Thus, FIG. 8 may be reinterpreted with node 150 taken as the mass of top plate 6 (FIG. 1) instead of power supply 13. 153 is taken as base 3 with bar 4, 151 is taken as the bulk of display 2, and the equations are slightly simplified by setting "$S_4^{-1}$" to zero. For the application of FIG. 1, the mass of the top plate is about ten times less than that of the monitor. (The ratio may be somewhat less for a small monitor, but a small monitor suffers less interference and requires less accurate correction.) The top plate center of gravity is several times closer to the spring center of base 3 than is the center of gravity of the monitor. Together, these imply that the lowest resonance of expression 161, as here interpreted, is about ten times higher than that of the monitor base combination. As this latter is known to be about three Hz, it can be seen that the correction terms for top plate mass would again affect three Hz. force information only about one one-hundredth as much as the correction terms present in the original form of equation 1.

Dissipation features have been omitted from the model systems considered to this point, since typical Q's observed for the low frequency modes requiring the greatest correction in the application of the preferred embodiment are in the range of fifty to one hundred.

Viscous dissipation features, however, are readily incorporated by following the general approach of FIGS. 7 and 8. This introduces terms with derivatives of odd order into the force equation derived. These terms have coefficient ratios to the next lowest order terms that express first order relaxation time constants; the reciprocal of the longest in each case being the radian frequency at which the higher term may acquire comparable importance to the lower.

Progressively more elaborate models aquire terms with progressively higher derivatives, and force derivatives are likely to appear on the left side. In some cases, the latter may be banished in a series solution formed by repeatedly differentiating and scaling the equation, and subtracting the result from itself; utility of such depending upon the frequency range of series convergence. Equation 7f may indeed be extended by this means to incorporate a single dashpot parallel to 132, as the interesting relaxation times (e.g. of the plastic tilt-swivel base taken by itself, when briefly deformed and released) correspond to frequencies well above the range to be corrected. The lowest frequencies of 142 (equation 7e), however, are much too low for the series solution of equation 7e ("$f_i$" assumed zero) to have a useful range of convergence.

In any case, extensions to the original form of equation 1 involve the addition of more terms for derivatives of some of the other orders of the variable six-vectors. These are generally of relatively low order, as term significance drops off rapidly with increasing order for the frequencies of interest. Series related terms need usually include only the base member, and the highest order terms arising in a model may be too small to need inclusion.

When empirical calibration is used to determine the coefficients of equation 1, in original or extended form, best fit coefficients will be found given the terms available, regardless of what model or expectations motivated the inclusion of such terms. Thus equation 7f and equation 8d provide somewhat different physical interpretations for the coefficient of the second derivative of the uncorrected force six-vector. Progressively more detailed models would provide progressively more elaborate and accurate interpretations. Careful spring and mass measurements, taken from progressively finer dissections of the system of FIG. 1, could in principle be used to calculate this progression of coefficients. Each such matrix in turn would have a somewhat different numerical value, but converging rather rapidly toward the single "true" value for the second order coefficient. Yet this latter is just the value found—given that the coefficients of other necessary terms are also being evaluated—by the empirical, in situ calibration method hereinbefore described. Determination of what other terms are necessary may be approached theoretically, as has been seen. It may also be approached experimentally, by the simple expedient of trying forms of equation 1 with differing sets of derivative orders present, to see what works best for the class of mechanical system relevant to a particular application. It should be noted that ommitting an unneeded term of lower order may be as important as including a necessary term of higher order, as ambiguities of solution can otherwise exist which preclude the convenience of a calibration in which the unknown forces applied to the excited system may all be zero.

Finally, in the preferred embodiment of the invention, evaluation of the correction terms in equation 1 is subject to known inaccuracies: a slight high frequency roll-up in the accelerometer channels reflecting their twenty three Hz resonance; the variations in the filtering components of the circuits 91 (FIG. 4); and the use of the second central difference for the second derivative. Each of these is a source of almost two percent error in the corrections. (Since these errors are independent, their combined expected value is around three percent, consistent with the before mentioned factor of thirty improvement attained.) Embodiments seeking improvement of correction for this application thus begin with improving the accuracy with which the present correction terms are evaluated, rather than by adding new terms to equation 1.

Therefore, in an alternative embodiment, sampling frequency may be increased, the accelerometer resonant frequency may be increased, and the two output capacitors of each circuit 91, preferably all in similar ratio, may be decreased. These changes improve the accuracy with which the correction terms of original equation 1 are evaluated, thereby further improving overall system rejection of inertial interference.

In still another embodiment, timing circuit signal 84 in the circuit of FIG. 4 is forced to a somewhat different amplitude by factory test apparatus, and the step responses of circuits 94 monitored, such that correcting inverse responses may be convolved into the filters 60 of FIG. 5. A correcting inverse over the frequency range of interest (up to about ten Hz) for the accelerometer resonance is likewise convolved into the accelerometer channel filters of 60. The filters of 60 thus modified are convolved into the filters of 61. The second derivative approximation may be expanded to a five tap filter. The linearity of operations is exploited to change the order of differentiation and matrix multiplication, so that the second derivative filter may be convolved into a copy of the eight force responsive filters of 61, as modified. Related matching delays may also be added to the other channels; and two copies of transformation 60 must be executed to provide both signal 71 and signal 72 of FIG. 5. Each of the resultant filters 61 is then shortened in group delay by truncating the (very small) lead coefficient. In this manner, correction accuracy is improved.

In either of these last embodiments, the low-pass cutoff frequency of filters 61 may be raised, allowing lower group delay. In this manner, improved correction may be exploited to provide faster system response.

While the invention as applied to the touch-input computer and related CRT or similar displays employing touch force location measurement techniques has been illustratively described, preferably embodying each of the novel accelerometer, derivative correction and calibration techniques of the invention, there are instances where the combination of all such techniques may not be required for inertial interference suppression, as before mentioned. Concerning the independence of the accelerometer and derivative connection techniques, there are touch screen systems such as some monitor or desktop systems without control of the support surface where only the accelerometer—based correction may be most useful. For a general purpose retrofit unit, on the other hand, a major problem resides in large or softly mounted monitors. Such units would benefit from the derivative—based correction only, at least for users with a reasonably solid desk or table. The novel calibration procedure is also more generally useful.

From another approach or viewpoint, a feature of the invention resides in its novel form of an effective linear filtering, at least as applied to force measurement. While, as earlier discussed, simple forms of so-called linear filtering have been proposed in other types of applications, such, unlike the present invention, generally attenuate all energy near the frequencies of distortion, rather than correcting the distortion. The present invention, as previously explained, quite to the contrary, attenuates the error of the signal but not the signal itself, even right at the frequencies of maximum error.

Conventional filtering, moreover, involves blocking frequencies in some range as strongly as possible, while passing others unaffected, and does so over a broad range of roughly similar installations. The method of the present invention, however, requires and involves the generation of calibration data that reflects the detailed quantitive characteristics of the supported mass and associated particular mechanical system of the specific installation.

A further striking difference underlying the invention is that it requires the output or outputs to have generally differing "filter" characteristics with respect to each of the multiple inputs, determined by the specific mechanical system characteristics. Only in quite rare instances might two be the same, as previously pointed out.

The novelty of the calibration procedure itself also appears to reside in several universal aspects. First, there is a large number of numbers to be determined—seventy two in the embodiment described—and they must be determined all at once, requiring at least the equivalent of a matrix inverse. A simple matrix inverse, however, is generally impossible to use since, in practice, there is never enough of the right kind of data to define a unique and tailor-made calibration for a specific installation. One of many possibilities must thus, under the invention, be found which can be expected to perform satisfactorily. Finally, the calibration "input" consists, in accordance with the invention, of approximately specified disturbances, with such effected while the real system inputs with respect to what is to be measured, are allowed to remain at zero.

Further modifications will also occur to those skilled in the art within the spirit and scope of the invention as defined in the appended claims. In addition to application of the several features of the invention independently or collectively to avoid the effects of inertial interference, these features, as before explained, may be applied to other types of force measurement systems, as well, including, but not limited to, weighing systems and the like.

What is claimed is:

1. In a touch-input computer and related supported display employing touch force location measurements, a method of eliminating errors introduced into force and/or torque measurements by undesired inertial interference motions of one or more of the support, mechanical system of the display and/or force measuring apparatus itself, that comprises, sensing one or more components of force and/or torque applied to the display by touch forces to provide force and/or torque measurements uncorrected for inertial interference motion effects that arise; sensing lineal and/or rotational acceleration of the display in response to such inertial interference motions; and correcting the uncorrected force and/or torque measurements in response to the acceleration sensing to achieve substantial elimination from the measurements of the effects of such inertial interference.

2. A method as claimed in claim 1 and in which said uncorrected force measurements are made and said acceleration is sensed for all relevant degrees of freedom of motion in a plurality of respective channels, and different linear combinations of the acceleration-sensing channels are negatively added in turn to each channel of force measurement, with coefficients of combinations chosen such that the resulting sums reflect the desired force measurements substantially free of inertial motion interference errors.

3. A method as claimed in claim 2 and in which time derivatives including at least a set of the second order derivatives of the uncorrected force measurements are derived and entered in different linear combinations of each order in turn in each channel of force measurement further to correct the same.

4. A method as claimed in claim 3 and in which calibration is effected from the supported display by intentionally moving and disturbing the same in various ways while the touch force ultimately to be measured is allowed to remain at zero, in order to generate a correction matrix the elements of which comprise the desired coefficients of combination to achieve the corrections of the force measurements in each channel.

5. A method as claimed in claim 4 and in which coefficients of combination for the correcting channels are derived at the display.

6. A method as claimed in claim 1 and in which the lineal and/or rotational acceleration sensing in response to said inertial interference motions develops waveforms for use in said correcting, and wherein the correcting is effected by negatively combing the wave-forms with those in the force measurements to cancel out and thus correct for the said inertial motion interference errors.

7. In a touch-input computer and related supported display employing touch force location measurements, a method of eliminating errors introduced into force and/or torque measurements by undesired inertial interference motions of one or more of the support, mechanical systems of the display and/or force measuring apparatus itself, that comprises, sensing one or more components of force and/or torque applied to the display by touch forces to provide a plurality of channels of force and/or torque measurements uncorrected for inertial interference effects that arise; deriving time derivatives including at least a set of the second order derivatives of the uncorrected force measurements and subtracting the same in different linear combinations of each order in turn from each channel of uncorrected force measurement, with coefficients of combination chosen such that the resulting sums reflect the desired force measurements substantially free of inertial motion interference errors.

8. In a touch-input computer and related supported display employing touch force location measurements, a method of eliminating errors introduced into force and/or torque measurements by undesired inertial interference motions of one or more of the support, mechanical systems of the display and/or force measuring apparatus itself, that comprises, sensing one or more components of force and/or torque applied to the display by touch forces to provide a plurality of channels of force and/or torque measurements uncorrected for inertial interference effects that arise; intentionally moving and disturbing the supported display in various ways while the touch force ultimately to be measured is not applied and is allowed to remain at zero, in order to generate measurements that enable calibration of the supported display system that renders the same less prone to force measurement errors due to motions of the type created by said moving and disturbing.

9. A method of measuring force and/or torque to be applied to a touch panel display system, including, where desired, objects associated therewith and portions of force measuring apparatus itself, that comprises, sensing one or more components of force and/or torque applied to the system by forces acting thereupon to provide force and/or torque measurements uncorrected for inertial interference motion effects that arise; sensing lineal and/or rotational acceleration of the system in response to such inertial interference motions; and correcting the uncorrected force and/or torque measurements in response to the acceleration sensing to achieve elimination from the measurements of the effects of such inertial interference.

10. A method as claimed in claim 9 and in which said uncorrected force measurements are made and said acceleration is sensed for all relevant degrees of freedom of motion in a plurality of respective channels, and different linear combinations of the acceleration-sensing channels are negatively added in turn to each channel of force measurement, with coefficients of combinations chosen such that the resulting sums reflect the desired force measurements substantially free of inertial motion interference errors.

11. A method as claimed in claim 10 and in which time derivatives including at least a set of the second order derivatives of the uncorrected force measurements are derived and extended in different linear combinations of each order in turn in each channel of force measurement further to correct the same.

12. A method as claimed in claim 11 and in which calibration is effected from the supported display by intentionally moving and disturbing the same in various ways while the touch force ultimately to be measured is allowed to remain at zero, in order to generate a correction matrix the elements of which comprise the desired coefficients of combination to achieve the corrections of the force measurements in each channel.

13. A method as claimed in claim 12 and in which coefficients of combination for the correcting channels are derived at the display.

14. A method of measuring force and/or torque to be applied to a touch panel display system, including, where desired, objects associated therewith and portions of forces measuring apparatus itself, that comprises, sensing one or more components of force and/or torque applied to the system by deliberate forces acting thereupon to provide force and/or torque measurements uncorrected by inertial interference motion effects that arise: deriving time derivatives including a least a set of the second order derivatives of the uncorrected force measurements and subtracting the same in different combinations of each order in turn from each channel of uncorrected force measurement, with coefficients of combination chosen such that the resulting sums reflect the desired force measurements substantially free of inertial motion interference errors.

15. A method of measuring force and/or torque to be applied to a touch panel display system, including, where desired, objects associated therewith and portions of force measuring apparatus itself, that comprises, sensing one or more components of force and/or torque applied to the system by deliberate forces acting thereupon to provide force and/or torque measurements uncorrected by inertial interference motion effects that may arise; deriving time effects that arise; intentionally moving and disturbing the system in various ways while said deliberate forces ultimately to be measured are not applied and are allowed to remain at zero, in order to generate measurements that enable calibration of the system that renders the same less prone to force measurement errors due to motions of the type created by said moving and disturbing.

16. In a touch-input computer and related supported display employing touch force location measurements, apparatus for eliminating errors introduced into force and/or to the measurements by undesired inertial interference motions of one or more of the support, mechanical system of the display and/or force measuring apparatus itself having, in combination, means for sensing one or more components of force and/or torque applied to the display by touch forces to provide force and/or torque measurements uncorrected for inertial interference motion effects that arise; means for sensing lineal and/or rotational acceleration of the display in response to such inertial interference motions; and means for correcting the uncorrected force and/or torque measurements in response to the acceleration sensing to achieve substantial elimination from the measurements of the effects of such inertial interference.

17. Apparatus as claimed in claim 16 and in which means is provided for making said uncorrected force measurements and sensing said acceleration for all relevant degrees of freedom of motion in a plurality of respective channels, and different linear combinations of the acceleration-sensing channels are subtracted in turn from each channel of force measurement, with coefficients of combinations chosen such that the resulting sums reflect the desired force measurements substantially free of inertial motion interference errors.

18. Apparatus as claimed in claim 17 and in which means is provided for deriving time derivatives including at least a set of the second order derivatives of the uncorrected force measurements and for entering the same in different linear combinations of each order in turn in each channel of force measurement further to correct the same.

19. Apparatus as claimed in claim 18 and in which calibration means is provided comprising means by intentionally moving and disturbing the supported display in various ways while the touch force ultimately to be measured is allowed to remain at zero, in order to generate a correction matrix the elements of which comprise the desired coefficients of combination to achieve the corrections of the force measurements in each channel.

20. A method as claimed in claim 19 and in which means for deriving coefficients of combination for the correcting channels is operated at the display.

21. In a touch-input computer and related supported display employing touch force location measurements, apparatus for eliminating errors introduced into force and/or torque measurements by undesired inertial interference motions of one or more of the support, mechanical systems of the display and/or force measuring apparatus itself, having, in combination, means for sensing one or more components of force and/or torque applied to the display by touch forces to provide a plurality of channels of force and/or torque measurements uncorrected for inertial interference effects that arise; means for deriving time derivatives including at least a set of the second order derivatives of the uncorrected force measurements and subtracting the same in different linear combinations of each order in turn from each channel of uncorrected force measurement, with coefficients of combination chosen such that the resulting sums reflect the desired force measurements substantially free of inertial motion interference errors.

22. In a touch-input computer and related supported display employing touch force location measurements, apparatus for eliminating errors introduced into force and/or torque measurements by undesired inertial interference motions of one or more of the support, mechanical systems of the display and/or force measuring apparatus itself, having, in combination, means for sensing one or more components of force and/or torque applied to the display by touch forces to provide a plurality of channels of force and/or torque measurements uncorrected for inertial interference effects that may arise; means for intentionally moving and disturbing the supported display in various ways while the touch force ultimately to be measured is not applied and is allowed to remain at zero, in order to generate measurements that enable calibration of the supported display system that renders the same less prone to force measurement errors due to motions of the type created by said moving and disturbing.

23. Apparatus for measuring force and/or torque to be applied to a touch panel display system, including, where desired, objects associated therewith and portions of force measuring apparatus itself, having, in combination, means for sensing one or more components of force and/or torque applied to the system by forces acting thereupon to provide force and/or torque measurements uncorrected for inertial interference motion effects that arise; means for sensing lineal and/or rotational acceleration of the system in response to such inertial interference motions; and means for correcting the uncorrected force and/or torque measurements in response to the acceleration sensing to achieve elimination from the measurements of the effects of such inertial interference.

24. Apparatus as claimed in claim 23 and in which said uncorrected force measurements are made and said acceleration is sensed for all relevant degrees of freedom of motion in a plurality of respective channels, and means is provided for negatively adding different linear combinations of the acceleration-sensing channels in turn to each channel of force measurement, with coefficients of combinations chosen such that the resulting sums reflect the desired force measurements substantially free of inertial motion interference errors.

25. Apparatus as claimed in claim 24 and in which means is provided to derive time derivatives including at least a set of the second order derivatives of the uncorrected force measurements and to enter the same in different linear combinations of each order in turn in each channel of force measurement further to correct the same.

26. Apparatus as claimed in claim 25 and in which calibration means is provided including means for intentionally moving and disturbing the same in various ways while the touch force ultimately to be measured is allowed to remain at zero, with means for generating a correction matrix the elements of which comprise the desired coefficients of combination to achieve the corrections of the force measurements in each channel.

27. Apparatus as claimed in claim 26 and in which means is provided for deriving the coefficients of combination for the correcting channels at the display.

28. In a computer input system providing measurements of the location at which a force is applied to a panel surface, a method of eliminating errors introduced into force and/or torque measurements by the desired inertial interference motions of one or more of the surface and/or force measuring apparatus itself, that comprises, sensing one or more components of force and/or torque applied to the surface by contact forces to provide force and/or torque measurements uncorrected for inertial interference motion effects that arise; sensing lineal and/or rotational acceleration of the surface in response to such inertial interference motions; and correcting the uncorrected force and/or torque measurements in response to the acceleration sensing to achieve substantial elimination from the measurements of the effects of such inertial interference.

29. A method as claimed in claim 28 and in which said surface comprises a supported touch-input panel surface to which forces are applied.

30. A method as claimed in claim 28 and in which said uncorrected force measurements are made and said acceleration is sensed for all relevant degrees of freedom of motion in a plurality of respective channels, and different linear combinations of the acceleration-sensing channels are subtracted in turn from each channel of force measurement, with coefficients of combinations chosen such that the resulting sums reflect the desired force measurements substantially free of inertial motion interference errors.

31. A method as claimed in claim 30 and in which time derivatives including at least a set of the second order derivatives of the uncorrected force measurements are derived and entered in different linear combinations of each order in turn in each channel of force measurement further to correct the same.

32. A method as claimed in claim 31 and in which calibration is effected by intentionally moving and disturbing the panel surface in various ways while the touch force ultimately to be measured is allowed to remain at zero, in order to generate a correction matrix the elements of which comprise the desired coefficients of combination to achieve the corrections of the force measurements in each channel.

33. A method of measuring force and/or torque to be applied to a supported touch-input system, including, where desired, objects associated therewith and portions of the force measuring apparatus itself that comprises, sensing one or more components of force and/or torque applied to the system by forces acting thereupon to provide force and/or torque measurements uncorrected by inertial interference motion effects that arise; deriving time derivatives including at least in one instance, the second time derivative of some or all of the uncorrected force measurements or linear combinations thereof by subtracting such linear combinations of some or all from an uncorrected force measurement, to yield the desired force measurement substantially free of inertial motion interference errors.

* * * * *